Figure 1:
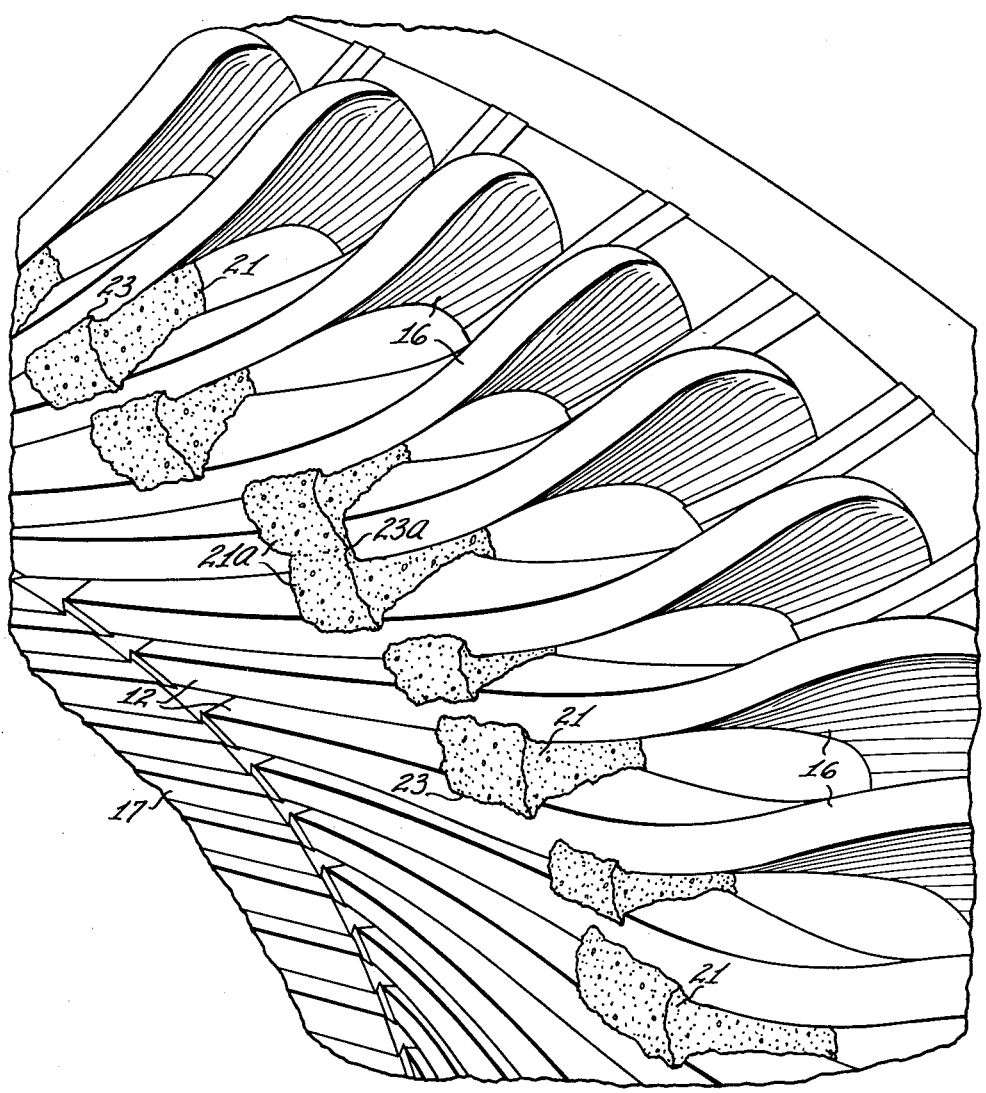

Inventors
Wilhelm A. Andersen
Paul W. Wagner
by Houston L. Swenson
Attorney

United States Patent Office 3,075,112
Patented Jan. 22, 1963

3,075,112
COIL SUPPORT FOR A DYNAMOELECTRIC MACHINE
Wilhelm A. Andersen and Paul D. Wagner, Cincinnati, Ohio, assignors to Allis-Chalmers Manufacturing Company, Milwaukee, Wis.
Filed Dec. 15, 1959, Ser. No. 859,666
2 Claims. (Cl. 310—260)

This invention relates to dynamoelectric machines and more particularly to an improved support for the windings of a dynamoelectric machine.

In the larger sizes of dynamoelectric machinery including A.C and D.C. motors, generators, and converters, the coils of the armature windings frequently extend beyond the iron core of the armature. These extending portions are frequently subjected to large forces caused by the influence of large transient or steady state currents which cause the end windings to vibrate. Over an extended period of time this movement is harmful to the windings. The continuous vibratory action eventually causes fatigue in the conductor and/or the insulator of the windings resulting in failure. Consequently, there have been various methods developed for supporting the windings to overcome vibration. Coil supports of the prior art have comprised premolded articles which are wedged between the coils. In installation, many of these supports require tools to manipulate the various adjustable wedging features in the support. While these supports have been found to be sufficient in machinery of a decade ago when windings were nearly self-supporting through the use of rigid insulation, this has not been the case in more recent models.

With the development of synthetic electrical insulating materials, the insulation on the coils now provides little or no support for the coil. More frequent use of full voltage starts, resulting in large currents, together with today's often severe duty cycles have placed a greater burden on the coil supports to sustain the resulting forces which have increased in both magnitude and frequency. While it might be possible to enhance the capabilities of preformed wedges of the prior art through an increase in size, the end result would be increased cost incurred by dies and materials used in the wedge support. Furthermore, each coil, while appearing to have the same shape, will actually vary to some degree in its contour. Consequently, a preformed wedge will make solid contact with the coils at only a few points. Of course, it would be impractical from an economic standpoint to mass-produce preformed supports that are designed for close conformity with a particular coil.

The object of the present invention is to provide a coil support which is easily constructed and will be in good supporting contact with its associated coils.

Another object of this invention is to provide a new and improved coil support which is formed while in contact with its associated coils.

A further object of this invention is to provide a new and improved coil support capable of withstanding substantial forces applied to its associated coils.

A further object of this invention is to provide a new and improved coil support which requires no external or additional retainment.

A further object of this invention is to provide a new and improved coil support for a dynamoelectric machine.

Figure 2:
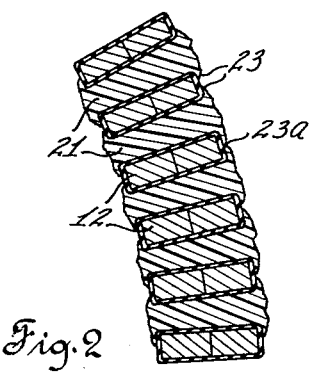

Other objects and advantages will be apparent from the following description when read in connection with the drawing in which:

FIG. 1 is a perspective view of a plurality of coil supports in association with coils forming a part of the armature of a dynamoelectric machine; and FIG. 2 shows a cross section of a plurality of supports and coils.

In FIG. 1, a portion of a dynamoelectric machine is shown having coils 12 with end portions 16 which extend beyond iron core 17. The coils are wound with a light weight dielectric which provides excellent insulation and improved efficiency in maintaining the machine at a cool temperature. In order to compensate for the reduction in support capabilities from the use of light weight insulating material, it is necessary to provide a coil support capable of withstanding considerable mechanical forces caused by large transient or steady state currents and rotating parts during the machine's operation. As illustrated, a plurality of coil supports 21 are positioned between adjacent end portions 16 in order to prevent them from vibrating.

Each coil support 21 is preferably formed of a wadding of absorbent material made of randomly spun fibers. Spun glass fiber and other absorbent materials such as polyester mats, synthetic foams, and various metallic and nonmetallic sponges are all suitable. The material may be obtained in sheet form and cut into individual pieces by scissors or other conventional cutting means. The dimensions of the individual pieces may be determined from the spaces between the coil ends 16 and the thickness or depth of the coils. The pieces are kept reasonably small in order to avoid reducing the ventilating passages of the coils. After a piece of absorbent material is cut it is dipped into a reservoir of an impregnating compound such as a thermoplastic or thermosetting resin which will be absorbed into the material. Thermosetting resins are particularly desirable if they do not require curing at high temperatures harmful to the insulation. One satisfactory impregnating compound which has been found to retain its dimensional stability throughout the temperature range normally encountered in rotating machinery comprises 100 parts of an epoxy resin in the range of 185–205 epoxide equivalent to 30 parts of aminoethylpiperazine. The latter is a curing agent which will completely cure the resin in less than one day at room temperature.

Upon removing the absorbent material from the reservoir of resin, the saturated material is wedged into the space between a pair of coils where pressure contact is made with the coil surfaces. Inasmuch as the resin has not yet cured, the saturated absorbent material is still in a pliable state and the contacting surfaces of the absorbent material readily conform with the contours of the coils. A small amount of pressure is used in wedging the support between the coils and consequently the support's center compresses with its ends assuming a flared position around the upper and lower edges of the coils. Flared portions 23 are more clearly seen in FIG. 2. The supports after having been applied to the coils are cured in order to set the resin which has impregnated the absorbent material. The resulting structures are strong supports which, because they have been molded on the coil, will assume the natural contour of the coil and thereby prevent the coils from materially vibrating and becoming fatigued. Advantages of the flared portions of the support are that the supports are prevented from falling out of the coils and relative radial motion of the coils is restricted.

Thus, it is apparent that the coil support of this invention overcomes the disadvantages of the prior art supports in that it provides increased support for the coils without materially reducing the ventilating passages in the windings. Furthermore, the time and skill involved in applying the supports are considerably decreased and the expense of the materials involved is small. The supports, if desired, may be formed so as to fuse with each other in order to form an integrally solid support ring. Thus, the flared portions of supports 21a may be bridged together such as portions 23a. This bridged arrangement provides maximum opposition to forces directed radially inward on the coils. On the other hand, it may be preferable to keep most of the supports separate so that a damaged coil may be replaced by removing an individual support without affecting the continuity of the other supports.

While only one embodiment of the present invention has been illustrated, it will be apparent to those skilled in the art that modifications other than those mentioned above may be made without departing from the spirit of the invention or from the scope of the appended claims.

Having now particularly described and ascertained the nature of our said invention and the manner in which it is to be performed, we declare that what we claim is:

1. In an electrical apparatus having a plurality of arcuately spaced coils, supports positioned between each pair of arcuately spaced coils, each said support comprising an individual pliable absorbent wadding impregnated with a thermosetting resin, said impregnated wadding wedged in the space between a pair of arcuately spaced coils whereby the contacting surfaces of said wadding are molded to assume the contours of a portion of said coils, said wadding having portions flared about the edges of said extensions to hold said coils in a fixed relative position.

2. In a dynamoelectric machine having a plurality of coils with arcuately spaced end extensions, supports positioned between each pair of said arcuately spaced end extensions, each said support comprising an individual pliable wadding of spun glass filaments impregnated with a thermosetting resin, said impregnated wadding wedged in the space between a pair of said arcuately spaced coil end extensions whereby the contacting surfaces of said wadding are molded to assume the contours of a portion of said coil extensions, said wadding having portions flared about the edges of said extensions to hold said coils in a fixed relative position.

References Cited in the file of this patent

UNITED STATES PATENTS

| | | |
|---|---|---|
| 2,602,829 | Fromm et al. | July 8, 1952 |
| 2,747,119 | Petersen et al. | May 22, 1956 |
| 2,749,460 | Acton et al. | June 5, 1956 |
| 2,774,900 | Acton et al. | Dec. 18, 1956 |